United States Patent
Bombaci et al.

(10) Patent No.: US 7,034,479 B2
(45) Date of Patent: Apr. 25, 2006

(54) DIGITAL INTERFACE FOR DRIVING AT LEAST A COUPLE OF POWER ELEMENTS, IN PARTICULAR IN PWM APPLICATIONS

(75) Inventors: Francesco Bombaci, Messina (IT); Alessandro Inglese, S.G. La Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 238 days.

(21) Appl. No.: 10/746,118

(22) Filed: Dec. 24, 2003

(65) Prior Publication Data

US 2004/0218409 A1    Nov. 4, 2004

(30) Foreign Application Priority Data

Dec. 24, 2002   (IT)   ........................... MI2002A2768

(51) Int. Cl.
*H02P 7/29* (2006.01)
(52) U.S. Cl. .................... 318/293; 363/56.04; 318/484
(58) Field of Classification Search ................ 318/254, 318/293, 445, 452, 484, 722, 801; 363/56.02, 363/58, 98, 56.04, 58.98; 327/108–112; 307/139–141, 141.8
See application file for complete search history.

(56) References Cited

U.S. PATENT DOCUMENTS

| | | | | |
|---|---|---|---|---|
| 4,504,899 A | * | 3/1985 | Jessee | ...................... 363/56.02 |
| 5,122,690 A | * | 6/1992 | Bianchi | ........................ 326/87 |
| 5,349,311 A | * | 9/1994 | Mentzer | ....................... 331/57 |
| 5,920,210 A | * | 7/1999 | Kaplinsky | .................... 327/112 |
| 6,400,197 B1 | * | 6/2002 | Lai et al. | ..................... 327/161 |
| 6,741,670 B1 | * | 5/2004 | Tester | ......................... 377/107 |
| 6,809,547 B1 | * | 10/2004 | Ingino et al. | ................. 326/30 |
| 6,847,237 B1 | * | 1/2005 | Kernhof et al. | ............. 327/110 |

* cited by examiner

*Primary Examiner*—Bentsu Ro
(74) *Attorney, Agent, or Firm*—Lisa K. Jorgenson; Allen, Dyer, Doppelt, Milbrath & Gilchrist, P.A.

(57) ABSTRACT

A digital interface for driving at least one complementary pair of first and second power elements connected in an inverter configuration between first and second voltage references is provided. The digital interface includes a first input terminal for receiving a PWM input signal, a first counter stage connected to the first input terminal, and a second counter stage connected to an output of the first counter stage. A toggle stage is connected to the first input terminal and to an output of the second counter stage. A first output terminal is connected to an output of the toggle stage, and is to be connected to a control terminal of the first power element. A second output terminal is connected to the output of the first counter stage for receiving a delayed PWM output signal therefrom, and is to be connected to a control terminal of the second power element. The toggle stage generates a second PWM output signal for the first output terminal. The second PWM output signal is kept at a desired low level in correspondence with switching of the PWM input signal having a lower duration than a predetermined duration.

24 Claims, 5 Drawing Sheets

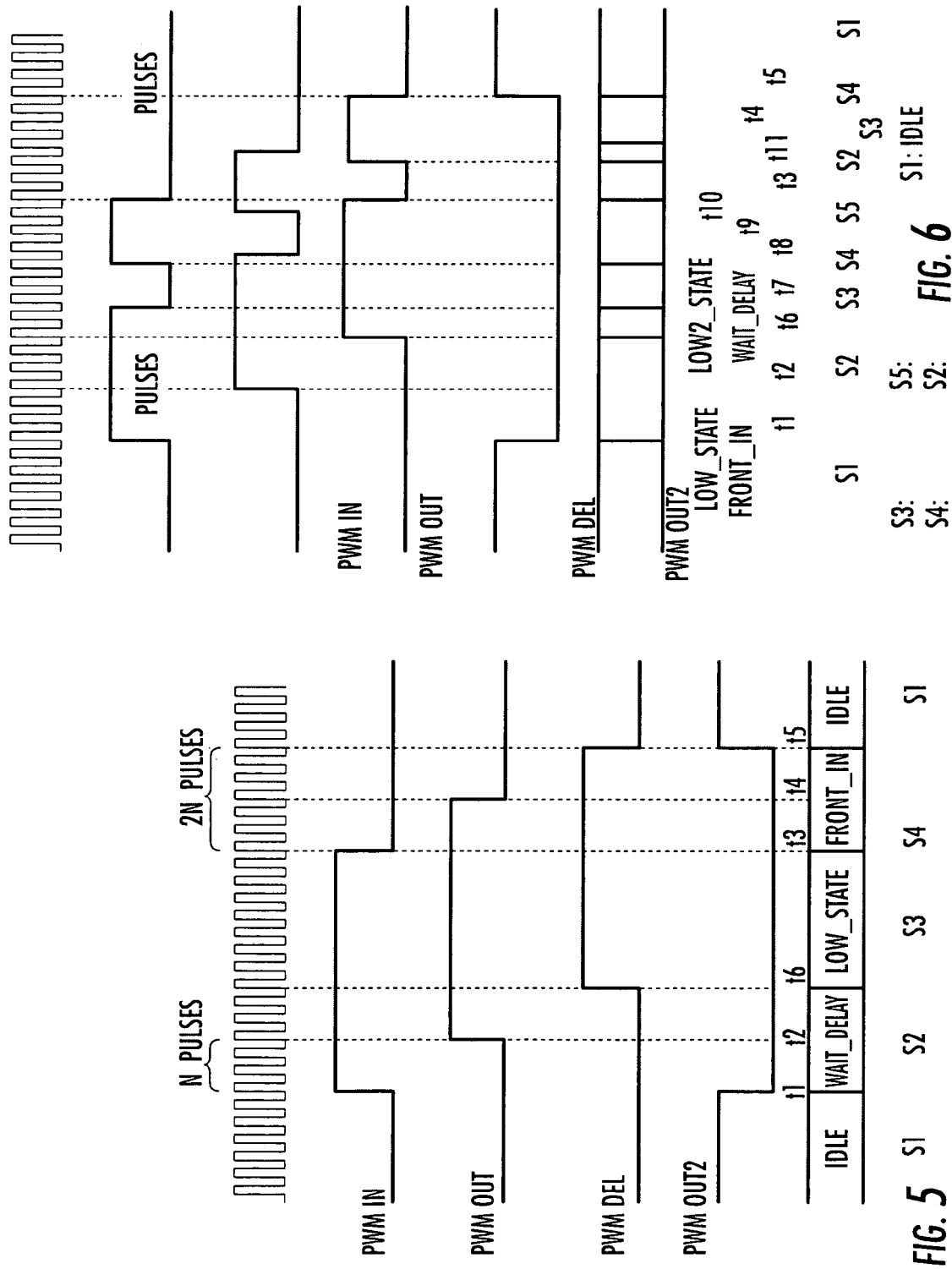

DIGITAL INTERFACE FOR DRIVING AT LEAST A COUPLE OF POWER ELEMENTS, IN PARTICULAR IN PWM APPLICATIONS

FIELD OF THE INVENTION

The present invention relates to a digital interface for driving power elements, such as in PWM applications. The present invention relates particularly, but not exclusively, to a digital interface for controlling IGBT power elements, and the following description is made with reference to this field of application for convenience of illustration only.

BACKGROUND OF THE INVENTION

Digital control systems for electronic power devices that drive electric motors are limited to the generation of an input signal, particularly of the PWM type. The input signals are conveniently modulated by digital peripherals integrated in microcontrollers connected to the motors to be driven. However, the output of these digital peripherals cannot be directly connected to the electrical power devices, such as IGBT transistors, for example.

FIG. 1 schematically shows a driving stage 1 whose input is connected to a digital peripheral and whose output is connected to the motor. The driving stage 1 essentially comprises an inverting stage 2 and a power branch 3. The power branch comprises a first power element T1 and a second power element T2 in series to each other between a first voltage reference and a second voltage reference. The first voltage reference may be a supply voltage Vcc, and the second voltage reference may be ground GND. The first and second power elements T1, T2 may be IGBT transistors, for example.

The driving stage 1 has an input terminal IN1 coupled with the inverting stage 2, and receives a trigger signal PWM. The driving stage 1 has an output terminal OUT1 coinciding with the interconnection point of the first and second power elements T1, T2.

The first power element T1 is inserted between the supply voltage reference Vcc and the output terminal OUT1, and has a control terminal (gate) G1 connected to the input terminal IN1 of the driving stage 1 via the inverting stage 2. The first power element T1 is generally indicated as a high-side driver transistor. The second power element T2 is inserted between the output terminal OUT1 and the ground reference GND, and has a control terminal (gate) G2 directly connected to the input terminal IN1 of the driving stage 1. The second power element T2 is generally indicated as a low-side driver transistor.

When using this type of driving stage during the PWM signal switching, it must be ensured that short-circuits between the high-side and low-side power elements T1, T2 of the power branch 3 are not triggered. For this purpose, a convenient analog interface may be used for generating a delay of the PWM signal applied to the control terminals of power elements T1 and T2. In particular, the analog interface is traditionally mounted on the board and comprises the driving stage 1.

One approach is to manufacture an analog interface 4 for generating a desired delay as shown in FIG. 2. The analog interface 4 is inserted between the input terminal IN1 of the driving stage 1 and the control terminals G1, G2 of the first and second power elements T1, T2. In particular, the analog interface 4 comprises a first circuit branch 5 and a second circuit branch 6 connect in parallel to each other and inserted between the input terminal IN1 and the control terminals G1, G2 of the first and second power elements T1, T2.

The first circuit branch 5 comprises a first resistor R1 inserted in parallel with a first diode D1, both cascade connected to a first hysteresis block IST1. An interconnection point X1 between the first hysteresis block IST1 and parallel to the first resistor R1 and the first diode D1 is connected to ground GND by a first capacitor C1.

Similarly, the second circuit branch 6 comprises a second resistor R2 inserted in parallel with a second diode D2, both cascade connected to a second hysteresis block IST2. An interconnection point X2 between the second hysteresis block IST2 and parallel to the second resistor R2 and the second diode D2 is connected to ground GND by a second capacitor C2. Circuitry controlling the power element collector-emitter voltage VCE can also be used. Although advantageous under many aspects, these known approaches have a major drawback linked to the insertion of additional components on the board comprising the driving stage 1.

SUMMARY OF THE INVENTION

An object of the present invention is to provide a digital interface for an electric motor control driving stage having structural and functional features to ensure an effective protection from a short-circuit of the power elements inserted in such a driving stage.

Another object of the present invention is for the digital interface to have a straightforward architecture that can be easily integrated in the digital peripheral together with the driving stage, thus overcoming the limits still affecting prior art devices.

These and other objects, advantages and features in accordance with the present invention are provided by a digital interface capable of processing the PWM input signal and generating a couple of complementary output signals to be applied to the control terminals of the power elements. These signals have a configurable time interval wherein they are both at zero.

In particular, the digital interface is for driving at least one complementary pair of first and second power elements connected in an inverter configuration between first and second voltage references. The digital interface may comprise a first input terminal for receiving a PWM input Signal, a first counter stage connected to the first input Terminal, and a second counter stage connected to an output of the first counter stage. A toggle stage may be connected to the first input terminal and to an output of the second counter stage. A first output terminal may be connected to an output of the toggle stage, and is to be connected to a control terminal of the first power element. A second output terminal may be connected to the output of the first counter stage for receiving a delayed PWM output signal therefrom, and is to be connected to a control terminal of the second power element. The toggle stage may generate a second PWM output signal for the first output terminal. The second PWM output signal may be kept at a desired low level in correspondence with switching of the PWM input signal having a lower duration than a predetermined duration.

Another aspect of the present invention is directed to a control system for an electrical motor comprising a driving stage to be connected to the electrical motor and comprising a complementary pair of first and second power elements connected in an inverter configuration between first and second voltage references, and a digital interface connected to the driving stage as defined above.

BRIEF DESCRIPTION OF THE DRAWINGS

The features and advantages of the interface according to the present invention will be apparent from the following description of an embodiment thereof given by way of a non-limiting example with reference to the attached drawings. In the drawings:

FIGS. 5 and 6 are also timing diagrams of signals in the digital interface of FIG. 3;

DETAILED DESCRIPTION OF THE PREFERRED EMBODIMENTS

Figure 1:
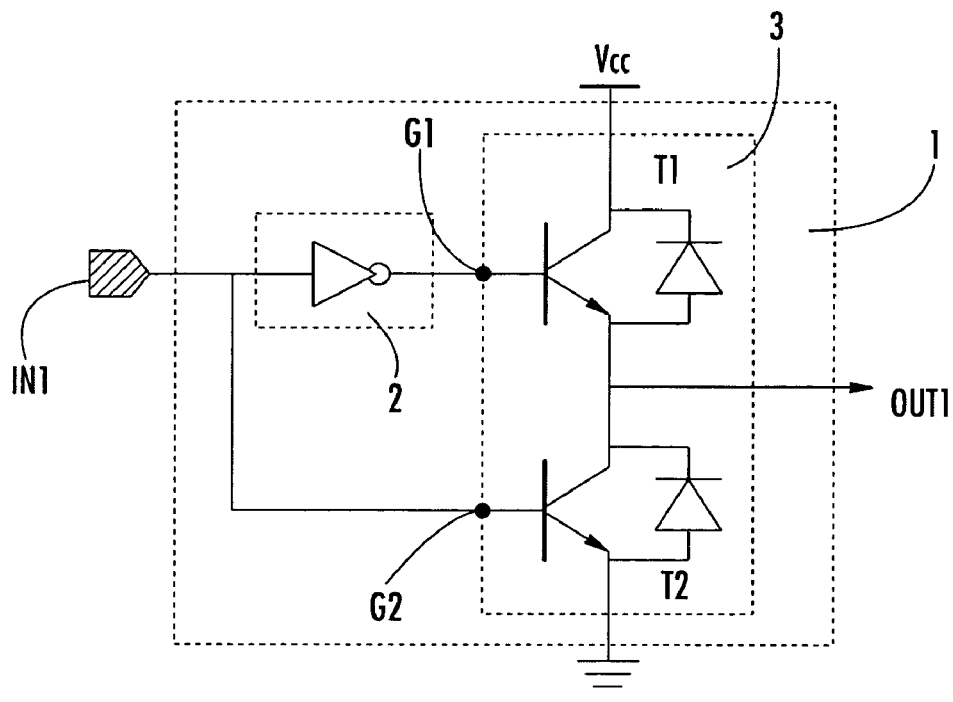
FIG. 1 schematically shows a driving stage of power elements for controlling electric motors according to the prior art.
Figure 2:
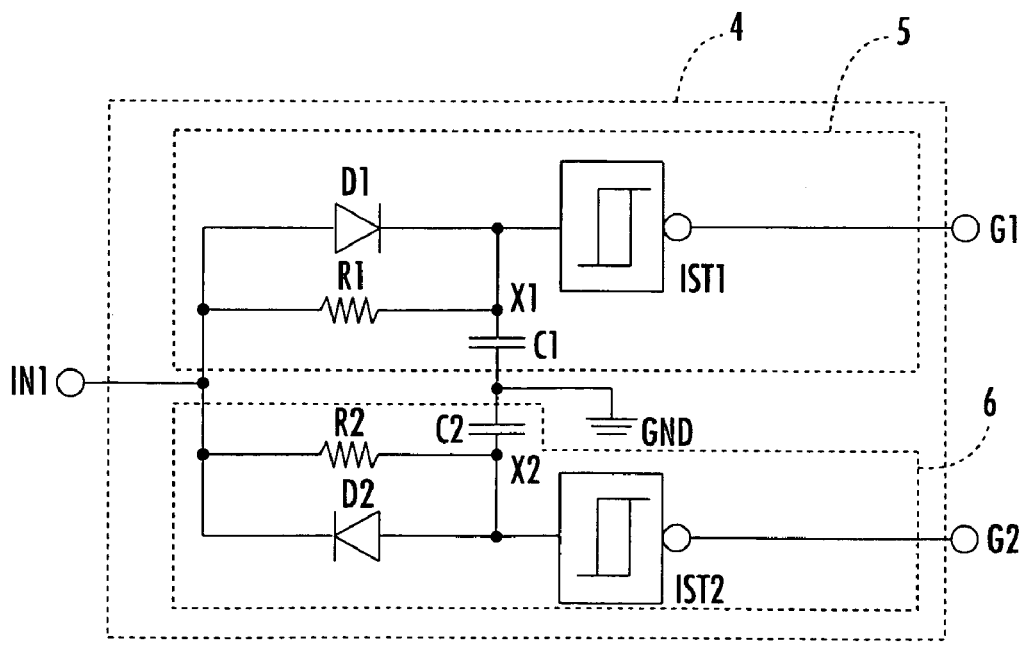
FIG. 2 schematically shows an analog interface associated with the driving stage of FIG. 1.
Figure 3:
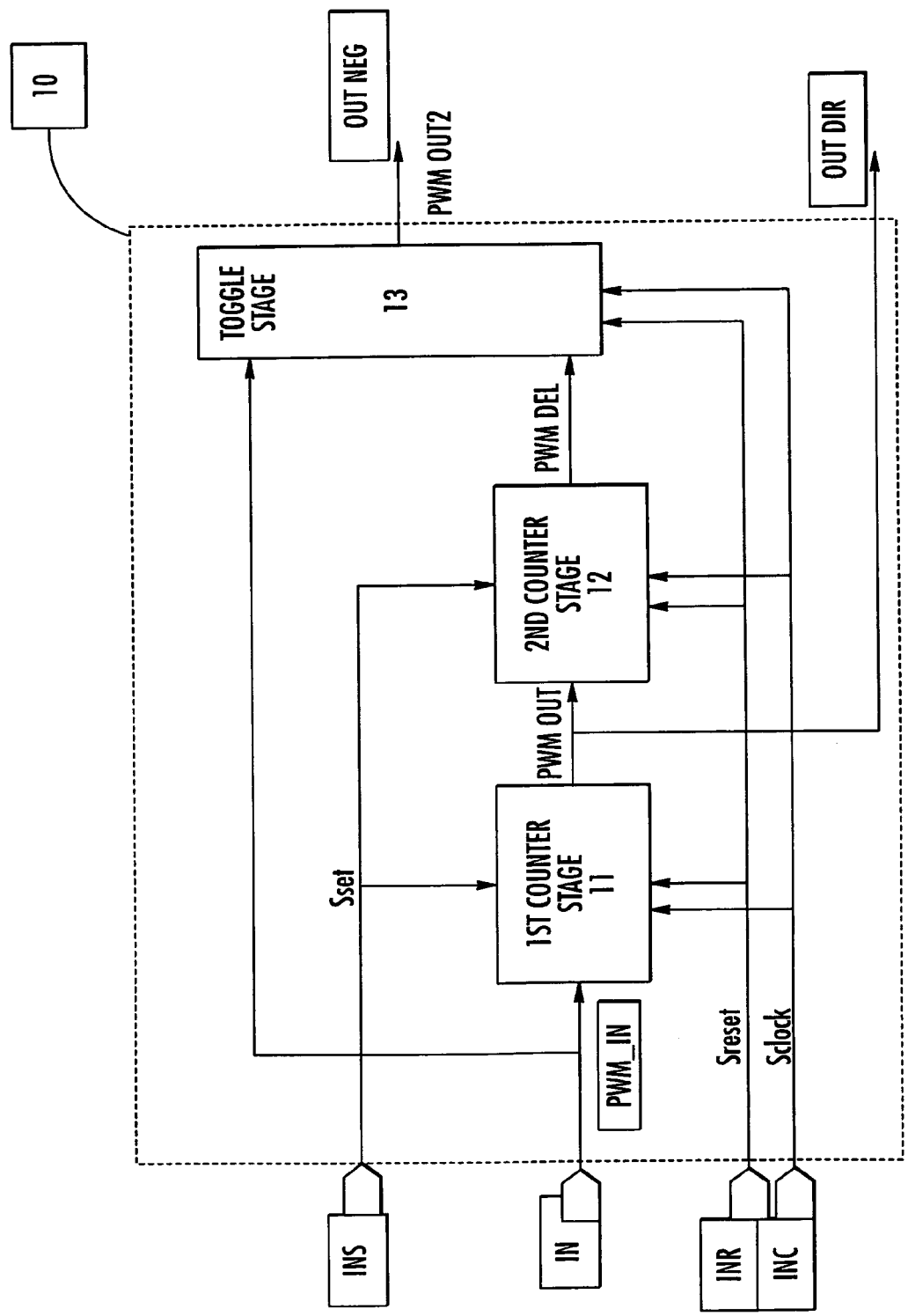
FIG. 3 schematically shows a digital interface according to the present invention.

With reference to the drawings, and particularly to FIG. 3, an embodiment of a digital interface according to the present invention is indicated by reference 10. The digital interface 10 has at the inputs thereof a first input terminal IN receiving a PWM signal PWM IN, a set terminal INS receiving a set signal Sset, a reset terminal INR receiving a reset signal Sreset and a clock terminal INC receiving a clock signal Sclock. The digital interface 10 also has a first output terminal Out neg and a second output terminal Out dir.

The digital interface 10 comprises a first counter stage 11 and a second counter stage 12, as well as a toggle stage 13, all cascade connected to each other between the input terminal IN and the first output terminal Out neg.

The first counter 11 is connected to the input terminal IN from which it receives the signal PWM IN and to the set INS, reset INR and clock INC terminals, as well as connected to the second counter 12 for providing it with a first output signal PWM OUT. Advantageously, the first counter 11 is output connected to the second output terminal Out dir for providing it with the first output signal PWM OUT. The second counter 12 is input connected to the first counter 11 from which it receives the first output signal PWM OUT and to the set INS, reset INR and clock INC terminals. The second counter 12 is output connected to the toggle stage 13 for providing it with a delayed signal PWM DEL.

The toggle stage 13 is input connected to the input terminal IN from which it receives the input signal PWM IN, as well as to the second counter 12 from which it receives the delayed signal PWM DEL, and to the reset INR and clock INC terminals. The toggle stage 13 is also output connected to the first output terminal Out neg for providing it with a second output signal PWM OUT2.

The first output terminal Out neg is connected to a control terminal of a first power element, and the second output terminal Out dir is connected to a control terminal of a second power element. As seen with reference to the prior art, the power elements are a complementary couple of IGBT power transistors T1 and T2 connected in an inverter configuration having control terminals G1 and G2 connected to the digital interface 10, for example.

Figure 4:
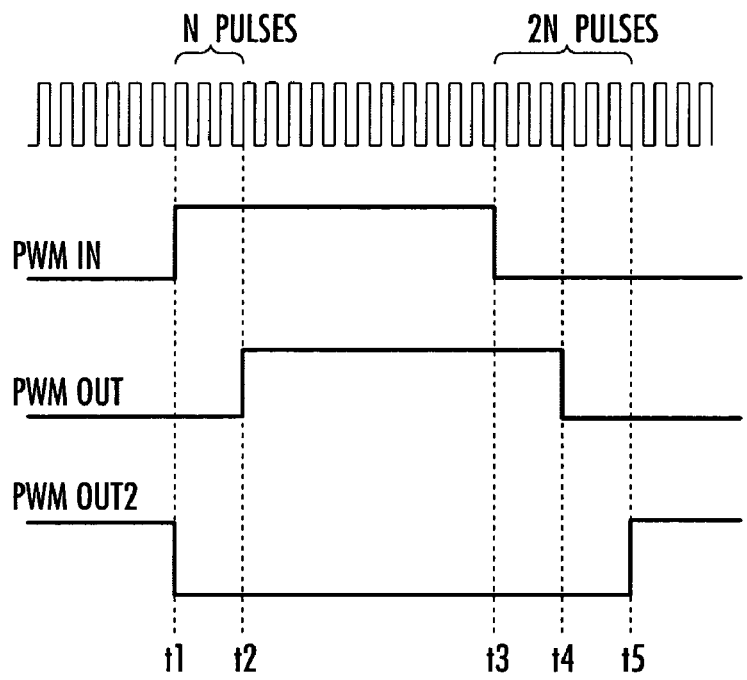
FIG. 4 is a timing diagram of signals in the digital interface of FIG. 3.

For a better understanding of the operation of the interface 10 according to the present invention, reference can be made to the signals shown in FIG. 4. In particular, FIG. 4 schematically shows the evolution in time of the input signal PWM IN, as well as the first output signal PWM OUT and the second output signal PWM OUT2.

At time t1, the input signal PWM IN has a rising edge, and by way of the first counter 11 (shift register), it is delayed by n (configurable) periods of the clock signal Sclock for generating the first delayed output signal PWM OUT, which has a rising edge at time t2. At time t1, the second output signal PWM OUT2 decreases.

The input signal PWM IN has a decreasing edge at time t3, and as previously explained, the first output signal PWM OUT has a decreasing edge at time t4, delayed by n clock periods with respect to time t3. Only at time t5, delayed by further n clock periods with respect to time t4, the second output signal PWM OUT2 has a rising edge. This ensures the correct operation of the digital interface 10 whose second output signal PWM OUT2 switches only after a time period from the first output signal PWM OUT being at zero. This time period corresponds to n clock periods and is thus advantageously configurable by the first and second counters 11, 12.

FIG. 5 shows in greater detail the evolution in time of signals in the digital interface 10 in normal operating conditions, i.e., without a rise of the input signal PWM IN preceding the breakdown of the first output signal PWM OUT. The input signal PWM IN has a rising edge at time t1 and goes back to zero at time t3. The first output signal OWM OUT, corresponding to the input signal PWM IN delayed by n clock periods, has a rising edge at time t2 and goes back to zero at time t4.

FIG. 5 also shows the evolution of the delayed signal PWM DEL output by the second counter 12. The delayed signal PWM DEL has a rising edge at time t6, delayed by N clock periods with respect to time t2 and then by 2N clock periods with respect to time t3 when the input signal PWM IN goes back to zero. The second output signal PWM OUT2 (having a complementary evolution with respect to the first output signal PWM OUT) has a decreasing edge at time t1 and it has again a rising edge only at time t5, delayed by N clock periods with respect to the switching of the first output signal PWM OUT (time t4) and by 2N clock periods with respect to the switching of the input signal PWM IN (time t3).

FIG. 6 shows, in greater detail, the evolution in time of signals in the digital interface 10 in anomalous operating conditions, i.e., with a new input signal PWM IN preceding the output signal PWM out breakdown. The input signal PWM IN, as already described in FIG. 5, has a rising edge at time t1 and goes back to zero at time t7. Moreover, it has a new rising edge F2 at time t8 and decreases again at time t3. The first output signal PWM OUT, corresponding to the input signal PWM IN delayed by n clock periods, rises at time t2 and goes back to zero at time t9 after the new rising edge of the input signal PWM IN (time t8). Afterwards, in response to the new rising edge of the input signal PWM IN, it rises again at time t10 and then decreases at time t4, as described also in FIG. 5.

FIG. 6 also shows the evolution of the delayed signal PWM DEL output by the second counter 12. As also described in FIG. 5, the delayed signal PWM DEL rises at time t6, delayed by N clock periods with respect to time t2 when the first output signal PWM OUT rises, and then by 2N clock periods with respect to time t1 when the input signal PWM IN rises. PWM DEL goes back to zero at time t3, delayed by N clock periods with respect to time t9 when the first output signal PWM OUT goes back to zero for the first time and by 2N clock periods with respect to time t7 when the input signal PWM IN goes back to zero for the first time. Afterwards, PWM DEL rises again at time t11, after the new rising edge F2 of the input signal PWM IN and decreases at time t5 delayed by N clock periods with respect to time t4 when the first output signal PWM OUT decreases and is delayed by 2N clock period with respect to time t3 when the input signal PWM IN decreases.

The second output signal PWM OUT2, similar to the description of FIG. 5, decreases at time t1 in correspondence with the rise of the input signal PWM IN and rises again only at time t5. This signal is delayed by N clock periods with respect to time t4 when the switching of the first output signal PWM OUT occurs and by 2N clock periods with respect to time t3 related to the switching of the input signal PWM IN. The input signal PWM IN has a new rising edge F2, at time t8, before the first output signal PWM OUT output by the first counter 11 decreases at time t9 (it has not decreased to zero yet).

It results then that the low-high transition of the second output signal PWM OUT2 (time t5) is delayed by 2N clock periods with respect to the high-low transition of the input signal PWM IN (time t3). The intermediate rising edge F2 of the input signal PWM IN does not trigger any transition of the second output signal PWM OUT2. Therefore, the digital interface 10 according to the invention ensures that the second output signal PWM OUT2 performs the low-high transition only after the first output signal PWM OUT is in the low condition, thus preventing short-circuits from being triggered in the driven inverter branch.

Figure 7:
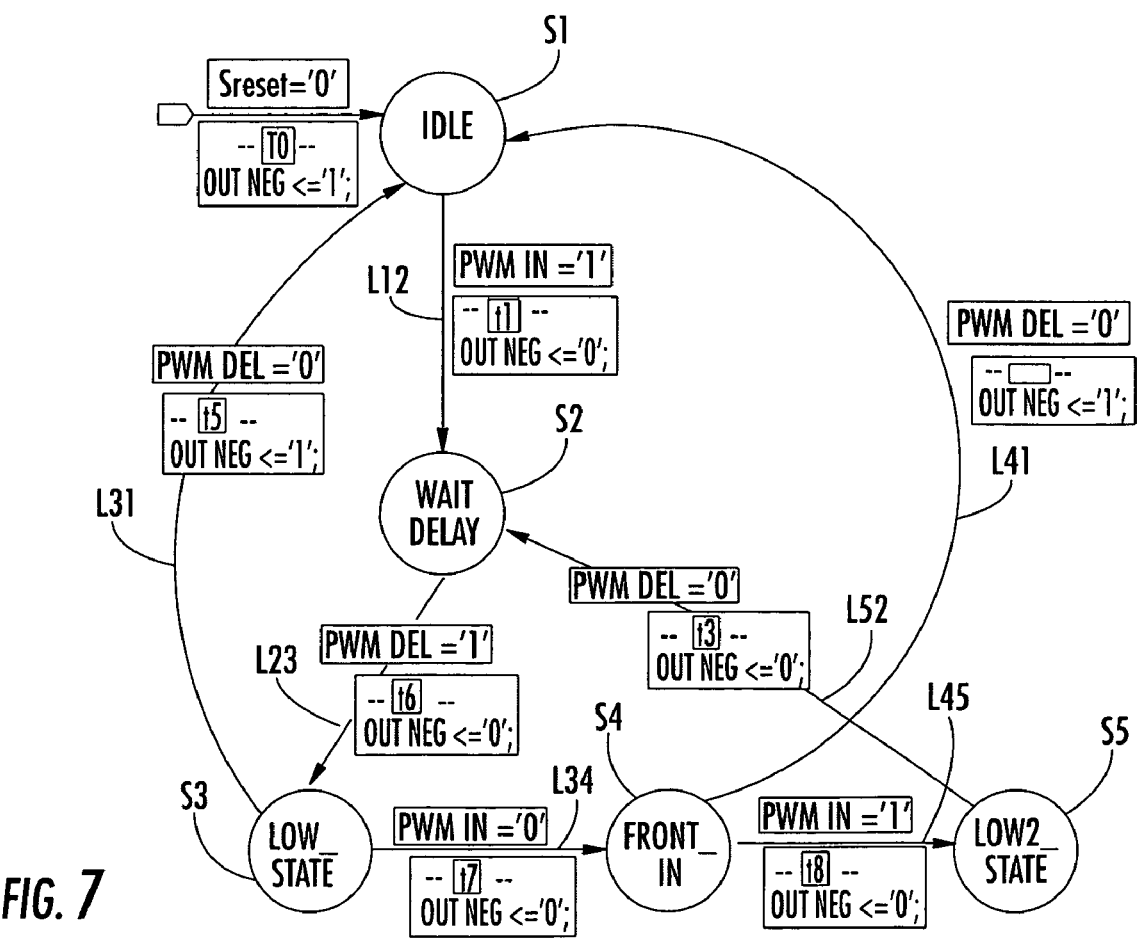
FIG. 7 schematically shows in detail operation of the interface of FIG. 3.

To obtain complementary and delayed output signals, the toggle block 13 is configured as shown in FIG. 7. In particular, this FIG. 7 shows a state diagram related to the operation of toggle block 13, whose implementation can be performed starting from this state diagram. The toggle block 13 substantially comprises a state machine having a first state S1 referred to as IDLE state, a second state S2 referred to as WAIT_DELAY state, a third state S3 referred to as LOW STATE state, and a fourth state S4 referred to as FRONT IN state and a fifth state S5 referred to as LOW2 STATE state.

The detailed description of the toggle block 13 will not be discussed in any further detail in connection with the operation of the digital interface 10 with reference to FIGS. 5 and 6. In a normal operation of the digital interface 10 (FIG. 5), the toggle block 13 takes in time the following states: up to time t1 and after time t5: state S1 (IDLE); from time t1 to time t6: state S2 (WAIT_DELAY); from time t6 to time t3: state S3 (LOW_STATE); and from time t3 to time t5: state S4 (FRONT_IN). In an anomalous operation of the digital interface 10 (FIG. 6), the toggle block 13 takes in time the following states: up to time t1 and after time t5: state S1 (IDLE); from time t1 to time t6 and from time t3 to time t11: state S2 (WAIT_DELAY); from time t6 to time t7 and from time t11 to time t4: state S3 (LOW_STATE); from time t7 to time t8: state S4 (FRONT_IN) and from time t4 to time t5: state S4 (FRONT_IN); and from time t8 to time t3: state S5 (LOW2_STATE).

The toggle block 13 deals with generating the second output signal PWM OUT2. In particular, in correspondence with a reset signal Sreset of the digital interface 10, the second output signal PWM OUT2 is in a high condition. With particular reference to the state description of FIG. 7, it can be seen that with a rise of the input signal PWM IN (low-high transition), the toggle block 13 passes from state S1 to state S2 (connection L12). Similarly, with a rise in the delayed signal PWM DEL, the toggle block 13 passes from state S2 to state S3 (connection L23).

Only with a decrease of the delayed signal PWM DEL (high-low transition), i.e., in the transition from state S3 to state S1 (connection L31), and from state S4 to state S1 (connection L41), the toggle block 13 allows the second output signal PWM OUT2 to rise. Therefore, in normal operating conditions, the toggle block 13 cyclically passes from state S1 to state S2 (connection L12), from state S2 to state S3 (connection L23), from state S3 to state S4 (connection L34) and from state S4 to state S1 (connection L41).

If, in anomalous operating conditions (FIG. 6), at time t8 a new rising edge of the input signal PWM IN occurs before the decreasing edge of the delayed signal PWM DEL (time t3), this edge must be ignored. In fact, this event occurs when the input signal PWM IN is at zero for a lower period than the value $2n*T_{MCK}$ ($T_{MCK}$ is the general system clock period), and in this case the second output signal PWM OUT2 must be still at zero.

Under similar conditions to the ones just described, the toggle block 13 passes from state S3 to state S4 (connection L34), from state S4 to state S5 (connection L45) and from state S5 to state S2 (connection L52) in correspondence with the high-low-high transitions of the input signal PWM IN (time t7 and t8) and with the high-low transition of the delayed signal PWM DEL (time t3). The toggle block 13 also provides a transition from state S3 to state S4 (connection L34) and from state S4 to state S1 (connection L41) when the delayed signal PWM DEL goes to zero before the new rising edge of the input signal PWM IN.

Advantageously, according to the invention, the toggle block 13 manages the transitions of the second output signal PWM OUT2 and allows the latter to perform a low-high transition only after 2N clock periods occurred with respect to the high-low transition of the input signal PWM IN. This also prevents also sudden switching of the input signal PWM IN from triggering corresponding switching of the second output signal PWM OUT2. Therefore, the digital interface 10 comprising the toggle block 13 ensures that output signals PWM OUT and PWM OUT2 are always complementary and that there is a time in which they are both at zero, thus preventing possible short-circuits in the power transistors of an inverter branch driven by the digital interface 10.

Figure 8:
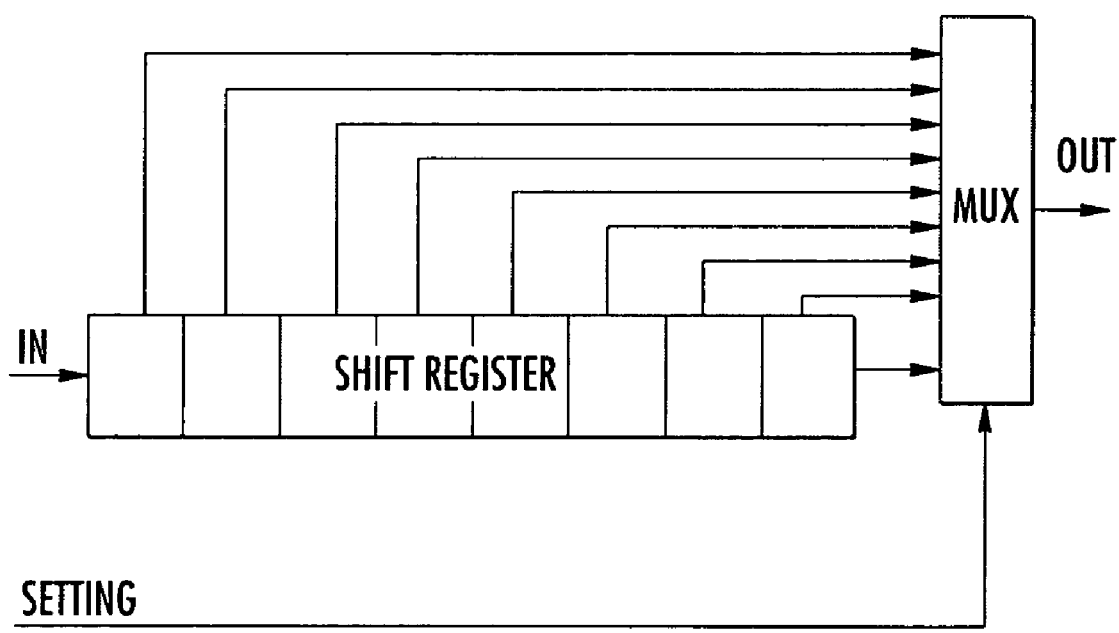
FIG. 8 schematically shows a counter as used in the digital interface of FIG. 3.

For completeness of the description, FIG. 8 shows a counter block, such as the first counter block 11 or the second counter block 12 in the digital interface 10. In particular, the counter block comprises a shift register having a configurable size synchronized with the general system clock signal Sclock. Moreover, the counter block comprises an output multiplexer receiving the setting signal.

It is worth noting that, in the case being considered for counter blocks that are effective at generating small delays with respect to the input signal PWM period and which minimize the harmonic distortion of the latter, the shift registers should be very small sized (16 bits at most). To the extent that it is necessary to insert higher delays, it is possible to reduce the system clock signal Sclock, which is also used for generating the input signal PWM, to minimize the harmonic distortion.

In conclusion, the digital interface 10, according to the invention, allows power elements for motor control to be driven, thus ensuring prevention of short-circuits between the power elements of a same inverter branch during the input signal PWM switching. The manufactured digital interface disregards the variability of the features of the power elements being driven.

The digital interface 10 manufactured according to the invention has been formed in 0.35 um CMOS technology, thus obtaining an area occupation of about 0.008 mm². By comparing this area with the traditional size of a 8-bit microcontroller, manufactured in the same technology and corresponding to about 20 mm², it is evident that the area increase (and thus the cost increase) due to the integration of the digital interface 10 is totally negligible if compared to the benefits in terms of operation safety and to the absence of further elements to be integrated in the board comprising the microcontroller. The advantage of performing an integrated digital control and the total absence of analog interfaces complicating the on-board system manufacture add thereto.

That which is claimed is:

1. A digital interface for driving at least one complementary pair of first and second power elements connected in an inverter configuration between first and second voltage references, the digital interface comprising:
    a first input terminal for receiving a PWM input signal;
    a first counter stage connected to the first input terminal;
    a second counter stage connected to an output of the first counter stage;
    a toggle stage connected to the first input terminal and to an output of the second counter stage;
    a first output terminal connected to an output of the toggle stage, and to be connected to a control terminal of the first power element; and
    a second output terminal connected to the output of the first counter stage for receiving a delayed PWM output signal therefrom, and to be connected to a control terminal of the second power element;
    the toggle stage generating a second PWM output signal for the first output terminal, the second PWM output signal being kept at a desired low level in correspondence with switching of the PWM input signal having a lower duration than a predetermined duration.

2. A digital interface according to claim 1, wherein the first and second counter stages and the toggle stage are synchronized by a same clock signal.

3. A digital interface according to claim 2, wherein the predetermined duration corresponds to 2N times a period of the clock signal.

4. A digital interface according to claim 3, wherein the toggle stage comprises a state machine.

5. A digital interface according to claim 4, wherein the state machine has the following sequence of operating states:
    changing from a first inactive state to a second wait state based upon a low-high transition of the PWM input signal;
    changing from the second wait state to a third low logic level state based upon a low-high transition of a delayed signal generated by the second counter stage and delayed by N times the clock period;
    changing from the third low logic level state to a fourth transition state based upon a high-low transition of the PWM input signal;
    changing from the fourth transition state back to the first inactive state based upon a high-low transition of the delayed signal; and
    the second PWM output signal performing a low-high transition delayed by 2N times the clock period with respect to the high-low transition of the PWM input signal when the state machine goes back to the first inactive state.

6. A digital interface according to claim 5, wherein the state machine further has the following sequence of operating states:
    changing from the third low logic level state to the fourth transition state based upon a high-low transition of the PWM input signal preceding the high-low transition of the delayed signal;
    changing from the fourth transition state to a fifth low logic level state based upon a low-high transition of the PWM input signal;
    changing from the fifth low logic level state to the second wait state based upon a high-low transition of the delayed signal;
    changing from the second wait state to the third low logic level state based upon a low-high transition of the delayed signal;
    changing from the third low logic level state to the fourth transition state based upon a low level of the input signal;
    changing from the fourth transition state back to the first inactive state based upon a high-low transition of the delayed signal; and
    when the state machine changes back to the first inactive state, the second output signal performing a low-high transition delayed by 2N times the clock period with respect to the high-low transition of the PWM input signal, the second output signal being kept at a low level during the high-low-high transition of the input signal which is lower than the predetermined duration.

7. A digital interface according to claim 6, wherein the state machine changes from the third low logic level state to the first inactive state based upon a high-low transition of the delayed signal immediately following a low-high transition of the delayed signal.

8. A digital interface according to claim 1, wherein the first and second counter stages and the toggle stage receive a same set signal and a same reset signal.

9. A control system for an electrical motor comprising:
    a driving stage to be connected to the electrical motor and comprising a complementary pair of first and second power elements connected in an inverter configuration between first and second voltage references; and
    a digital interface connected to the driving stage and comprising
        a first input terminal for receiving a PWM input signal,
        a first counter stage having an input connected to the first input terminal and an output providing a delayed PWM output signal to a control terminal of the second power element,
        a second counter stage having an input connected to the output of the first counter stage, and
        a toggle stage having inputs connected to the first input terminal and to an output of the second counter stage, and an output connected to a control terminal of the first power element for providing a second PWM output signal, the second PWM output signal being kept at a desired low level in correspondence with switching of the PWM input signal having a lower duration than a predetermined duration.

10. A control system according to claim 9, wherein the first and second counter stages and the toggle stage are synchronized by a same clock signal.

11. A control system according to claim 10, wherein the predetermined duration corresponds to 2N times a period of the clock signal.

12. A control system according to claim 11, wherein the toggle stage comprises a state machine.

13. A control system according to claim 12, wherein the state machine has the following sequence of operating states:
- changing from a first inactive state to a second wait state based upon a low-high transition of the PWM input signal;
- changing from the second wait state to a third low logic level state based upon a low-high transition of a delayed signal generated by the second counter stage and delayed by N times the clock period;
- changing from the third low logic level state to a fourth transition state based upon a high-low transition of the PWM input signal;
- changing from the fourth transition state back to the first inactive state based upon a high-low transition of the delayed signal; and
- the second PWM output signal performing a low-high transition delayed by 2N times the clock period with respect to the high-low transition of the PWM input signal when the state machine goes back to the first inactive state.

14. A control system according to claim 13, wherein the state machine further has the following sequence of operating states:
- changing from the third low logic level state to the fourth transition state based upon a high-low transition of the PWM input signal preceding the high-low transition of the delayed signal;
- changing from the fourth transition state to a fifth low logic level state based upon a low-high transition of the PWM input signal;
- changing from the fifth low logic level state to the second wait state based upon a high-low transition of the delayed signal;
- changing from the second wait state to the third low logic level state based upon a low-high transition of the delayed signal;
- changing from the third low logic level state to the fourth transition state based upon a low level of the input signal;
- changing from the fourth transition state back to the first inactive state based upon a high-low transition of the delayed signal; and
- when the state machine changes back to the first inactive state, the second output signal performing a low-high transition delayed by 2N times the clock period with respect to the high-low transition of the PWM input signal, the second output signal being kept at a low level during the high-low-high transition of the input signal which is lower than the predetermined duration.

15. A control system according to claim 14, wherein the state machine changes from the third low logic level state to the first inactivity state based upon a high-low transition of the delayed signal immediately following a low-high transition of the delayed signal.

16. A control system according to claim 9, wherein the first and second counter stages and the toggle stage receive a same set signal and a same reset signal.

17. A method for interfacing with a driving stage connected to an electrical motor, the driving stage comprising a complementary pair of first and second power elements connected in an inverter configuration between first and second voltage references, the method comprising:
- connecting a first counter stage to a first input terminal receiving a PWM input signal;
- connecting a second counter stage to an output of the first counter stage;
- connecting a toggle stage to the first input terminal and to an output of the second counter stage;
- connecting an output of the toggle stage to a control terminal of the first power element; and
- connecting the output of the first counter stage to a control terminal of the second power element for providing a delayed PWM output signal thereto; and
- the toggle stage generating a second PWM output signal, the second PWM output signal being kept at a desired low level in correspondence with switching of the PWM input signal having a lower duration than a predetermined duration.

18. A method according to claim 17, wherein the first and second counter stages and the toggle stage are synchronized by a same clock signal.

19. A method according to claim 18, wherein the predetermined duration corresponds to 2N times a period of the clock signal.

20. A method according to claim 19, wherein the toggle stage comprises a state machine.

21. A method according to claim 20, wherein the state machine has the following sequence of operating states:
- changing from a first inactive state to a second wait state based upon a low-high transition of the PWM input signal;
- changing from the second wait state to a third low logic level state based upon a low-high transition of a delayed signal generated by the second counter stage and delayed by N times the clock period;
- changing from the third low logic level state to a fourth transition state based upon a high-low transition of the PWM input signal;
- changing from the fourth transition state back to the first inactive state based upon a high-low transition of the delayed signal; and
- the second PWM output signal performing a low-high transition delayed by 2N times the clock period with respect to the high-low transition of the PWM input signal when the state machine goes back to the first inactive state.

22. A method according to claim 21, wherein the state machine further has the following sequence of operating states:
- changing from the third low logic level state to the fourth transition state based upon a high-low transition of the PWM input signal preceding the high-low transition of the delayed signal;
- changing from the fourth transition state to a fifth low logic level state based upon a low-high transition of the PWM input signal;
- changing from the fifth low logic level state to the second wait state based upon a high-low transition of the delayed signal;
- changing from the second wait state to the third low logic level state based upon a low-high transition of the delayed signal;
- changing from the third low logic level state to the fourth transition state based upon a low level of the input signal;

changing from the fourth transition state back to the first inactive state based upon a high-low transition of the delayed signal; and when the state machine changes back to the first inactive state, the second output signal performing a low-high transition delayed by 2N times the clock period with respect to the high-low transition of the PWM input signal, the second output signal being kept at a low level during the high-low-high transition of the input signal which is lower than the predetermined duration.

23. A method according to claim 22, wherein the state machine changes from the third low logic level state to the first inactivity state based upon a high-low transition of the delayed signal immediately following a low-high transition of the delayed signal.

24. A method according to claim 17, wherein the first and second counter stages and the toggle stage receive a same set signal and a same reset signal.

* * * * *